US010824495B2

(12) United States Patent
Leggette et al.

(10) Patent No.: US 10,824,495 B2
(45) Date of Patent: Nov. 3, 2020

(54) CRYPTOGRAPHIC KEY STORAGE IN A DISPERSED STORAGE NETWORK

(71) Applicant: International Business Machines Corporation, Armonk, NY (US)

(72) Inventors: Wesley B. Leggette, Chicago, IL (US); Jason K. Resch, Chicago, IL (US)

(73) Assignee: PURE STORAGE, INC., Mountain View, CA (US)

(*) Notice: Subject to any disclaimer, the term of this patent is extended or adjusted under 35 U.S.C. 154(b) by 390 days.

(21) Appl. No.: 15/439,092

(22) Filed: Feb. 22, 2017

(65) Prior Publication Data

US 2017/0250809 A1 Aug. 31, 2017

Related U.S. Application Data

(60) Provisional application No. 62/301,214, filed on Feb. 29, 2016.

(51) Int. Cl.
*G06F 21/00* (2013.01)
*H04L 29/06* (2006.01)
(Continued)

(52) U.S. Cl.
CPC .......... *G06F 11/0781* (2013.01); *G06F 3/064* (2013.01); *G06F 3/0604* (2013.01);
(Continued)

(58) Field of Classification Search
CPC .. G06F 11/1076; G06F 3/0659; G06F 3/0604; G06F 11/0727; G06F 11/0751;
(Continued)

(56) References Cited

U.S. PATENT DOCUMENTS 4,092,732 A 5/1978 Ouchi
5,454,101 A 9/1995 Mackay et al.
(Continued)

FOREIGN PATENT DOCUMENTS

WO WO-2019142075 A1 * 7/2019 ........... H04L 9/3252

OTHER PUBLICATIONS

Pawani Porambage ; Yoan Miche ; Aapo Kalliola ; Madhusanka Liyanage ; Mika Ylianttila ; "Secure Keying Scheme for Network Slicing in 5G Architecture"; 2019 IEEE Conference on Standards for Communications and Networking (CSCN); Year Mar. 2019; Conference Paper; Publisher: IEEE; pp. 1-6 (Year: 2019).*
(Continued)

*Primary Examiner* — Shewaye Gelagay
*Assistant Examiner* — Courtney D Fields
(74) *Attorney, Agent, or Firm* — Garlick & Markison; Timothy W. Markison; Harry Tyson, Jr.

(57) ABSTRACT

Methods for use in a storage unit of a dispersed storage network (DSN) to securely store cryptographic key information. In various examples, the storage unit receives a slice access request relating to a key slice generated by performing a dispersed storage error encoding function on an encryption key. When the slice access request includes a request to store the key slice, the storage unit encrypts the key slice using a local key and stores the encrypted key slice (e.g., in a key region of a storage vault). When the slice access request includes a request to recover a key slice stored in the storage unit, the encrypted key slice is recovered from memory and decrypted using the local key to produce a decrypted key slice for provision to the requesting entity. For rebuilding operations, the storage unit may instead return a zero information gain (ZIG) representation of the key slice.

20 Claims, 6 Drawing Sheets

(51) Int. Cl.

| | |
|---|---|
| *H04L 9/32* | (2006.01) |
| *G06F 11/07* | (2006.01) |
| *G06F 30/20* | (2020.01) |
| *G06F 3/06* | (2006.01) |
| *G06F 11/10* | (2006.01) |
| *G06F 11/14* | (2006.01) |
| *G06F 11/20* | (2006.01) |
| *G06F 11/30* | (2006.01) |
| *G06F 11/32* | (2006.01) |
| *G06F 13/40* | (2006.01) |
| *G06F 13/42* | (2006.01) |
| *G06N 3/04* | (2006.01) |
| *G06N 3/08* | (2006.01) |
| *G06N 3/10* | (2006.01) |
| *G06Q 10/00* | (2012.01) |
| *H03M 13/15* | (2006.01) |
| *H03M 13/29* | (2006.01) |
| *H03M 13/37* | (2006.01) |
| *H03M 13/00* | (2006.01) |
| *H04L 9/08* | (2006.01) |
| *H04L 9/14* | (2006.01) |
| *G06Q 10/06* | (2012.01) |

(52) U.S. Cl.
CPC .......... *G06F 3/0605* (2013.01); *G06F 3/0619* (2013.01); *G06F 3/0623* (2013.01); *G06F 3/0629* (2013.01); *G06F 3/0644* (2013.01); *G06F 3/0653* (2013.01); *G06F 3/0659* (2013.01); *G06F 11/0709* (2013.01); *G06F 11/079* (2013.01); *G06F 11/0727* (2013.01); *G06F 11/0751* (2013.01); *G06F 11/0793* (2013.01); *G06F 11/1076* (2013.01); *G06F 11/1451* (2013.01); *G06F 11/2094* (2013.01); *G06F 11/3034* (2013.01); *G06F 11/3051* (2013.01); *G06F 11/3055* (2013.01); *G06F 11/327* (2013.01); *G06F 13/4022* (2013.01); *G06F 13/4282* (2013.01); *G06F 30/20* (2020.01); *G06N 3/04* (2013.01); *G06N 3/084* (2013.01); *G06N 3/10* (2013.01); *G06Q 10/06316* (2013.01); *G06Q 10/063116* (2013.01); *G06Q 10/20* (2013.01); *H03M 13/1515* (2013.01); *H03M 13/2909* (2013.01); *H03M 13/3761* (2013.01); *H03M 13/616* (2013.01); *H04L 9/0869* (2013.01); *H04L 9/0894* (2013.01); *H04L 9/14* (2013.01); *H04L 9/3242* (2013.01); *H04L 63/0428* (2013.01); *H04L 63/061* (2013.01); *H04L 63/101* (2013.01); *G06F 3/067* (2013.01); *G06F 2201/84* (2013.01)

(58) Field of Classification Search
CPC ............. G06F 11/0781; G06F 11/0793; G06F 11/0709; G06F 11/327; G06F 11/3055; G06F 11/3051; G06F 11/3034; G06F 11/1451; G06F 3/0623; G06F 3/0644; G06F 11/079; G06F 13/4282; G06F 13/4022; G06F 3/0653; G06F 3/0605; G06F 3/0629; G06F 17/5009; G06F 3/0619; G06F 3/067; G06F 3/064; G06F 2201/84; H03M 13/3761; H03M 13/2909; H03M 13/1515; H03M 13/616; H04L 9/0869; H04L 9/3242; H04L 63/101; H04L 9/14; H04L 9/0894; H04L 63/061; G06Q 10/20; G06Q 10/063116; G06Q 10/06316; G06N 3/04; G06N 3/084; G06N 3/10

See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,578,144 B1 | 6/2003 | Gennaro et al. |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |

(56) References Cited

U.S. PATENT DOCUMENTS

| | | |
|---|---|---|
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2013/0290703 A1* | 10/2013 | Resch .............. H04L 67/1097 713/155 |
| 2014/0108815 A9 | 4/2014 | Dhuse et al. |
| 2014/0337622 A1 | 11/2014 | Resch et al. |
| 2015/0235032 A1* | 8/2015 | Grube .................. G06F 21/602 713/193 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

International Searching Authority; International Search Report and Written Opinion; International Application No. PCT/IB2017/051010; dated Jun. 15, 2017; 12 pgs.

* cited by examiner

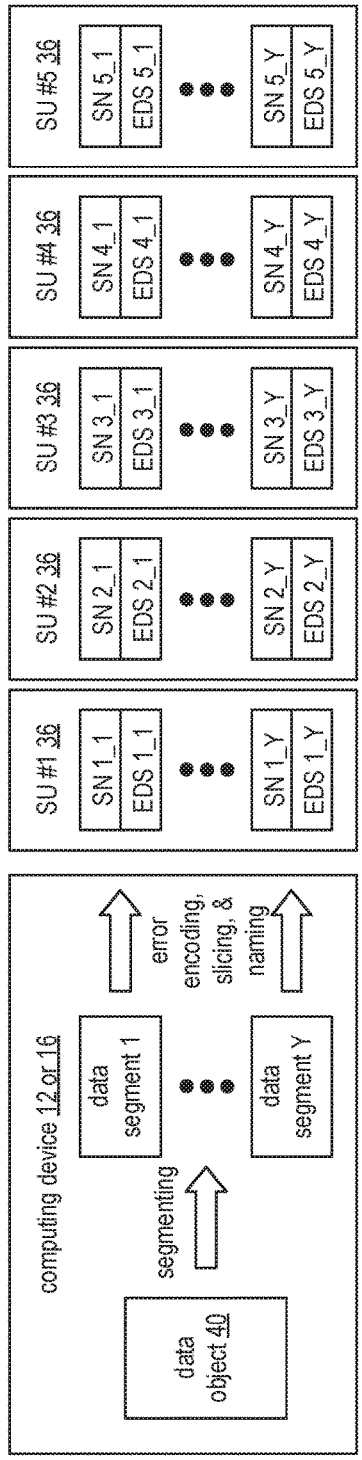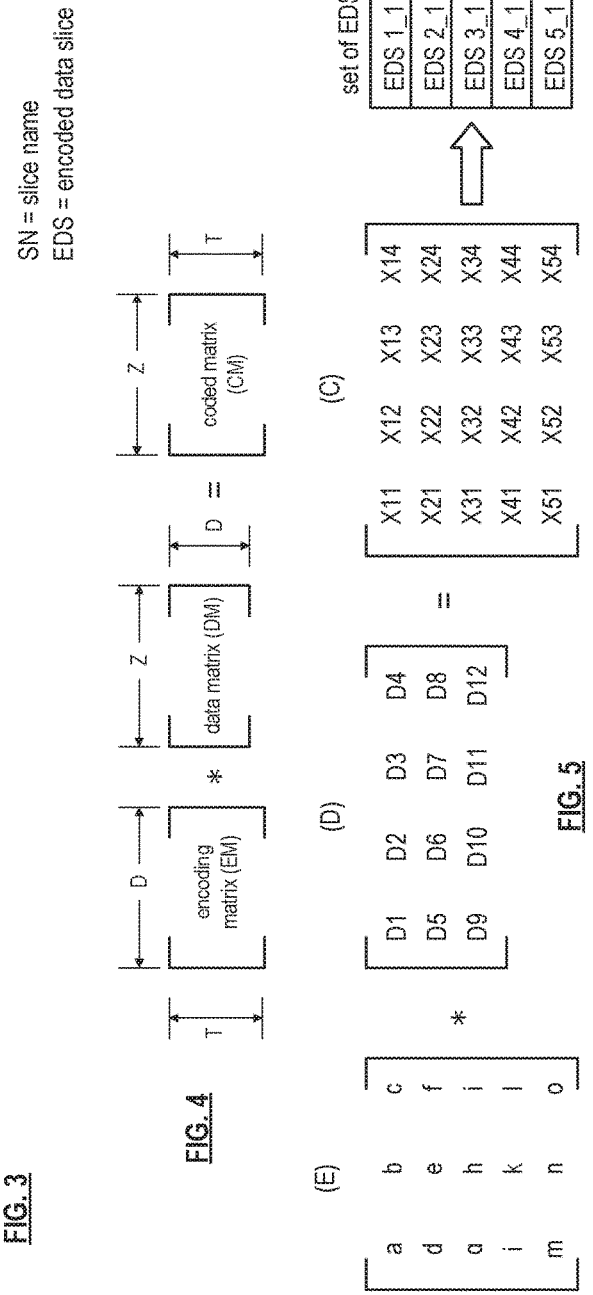

US 10,824,495 B2

CRYPTOGRAPHIC KEY STORAGE IN A DISPERSED STORAGE NETWORK

CROSS-REFERENCE TO RELATED APPLICATIONS

The present U.S. Utility patent application claims priority pursuant to 35 U.S.C. § 119(e) to U.S. Provisional Application No. 62/301,214, entitled "ENHANCING PERFORMANCE OF A DISPERSED STORAGE NETWORK," filed Feb. 29, 2016, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to storage of cryptographic keys in a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

BRIEF DESCRIPTION OF THE SEVERAL VIEWS OF THE DRAWING(S)

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION OF THE INVENTION

Figure 1:
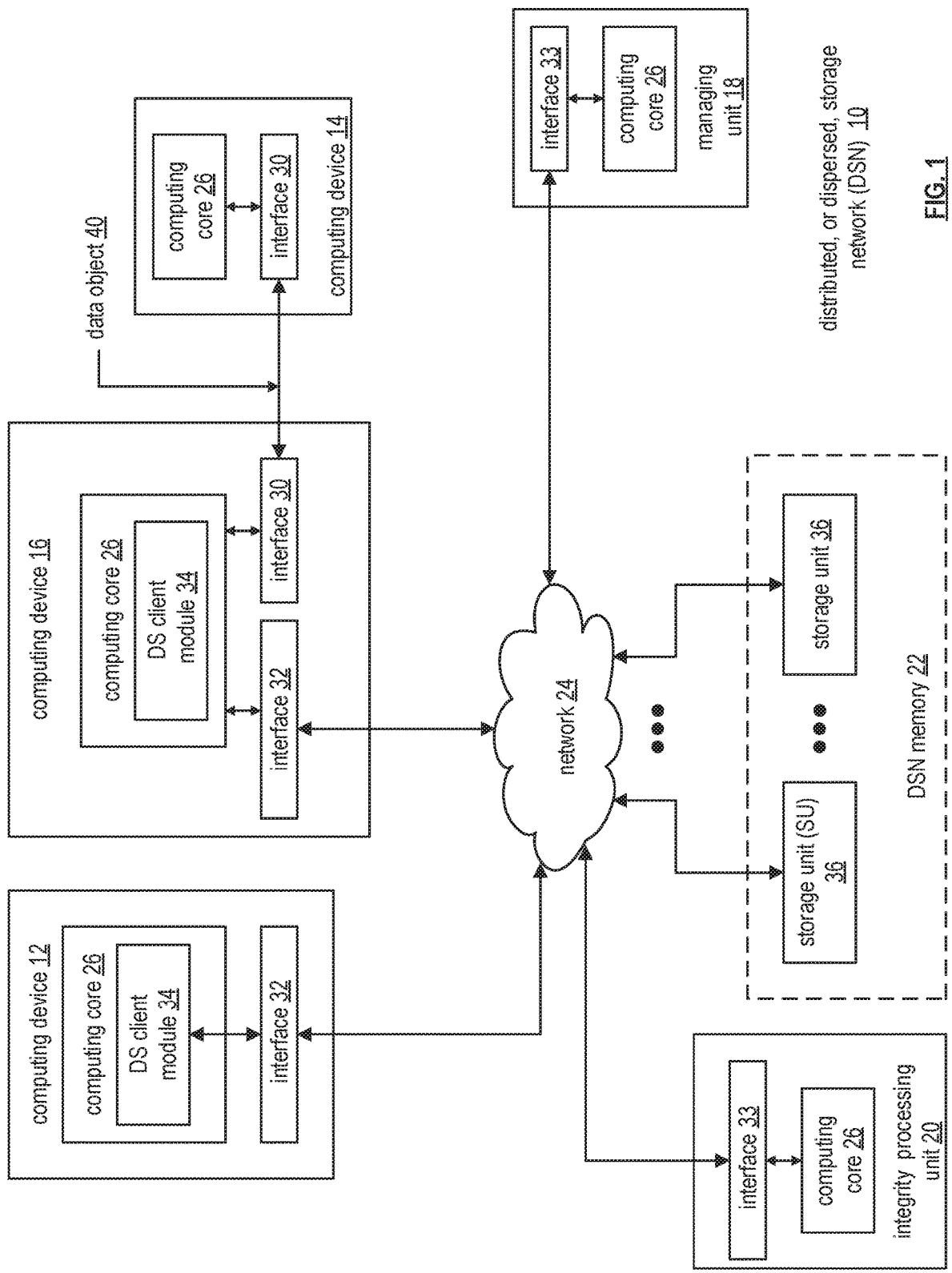
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
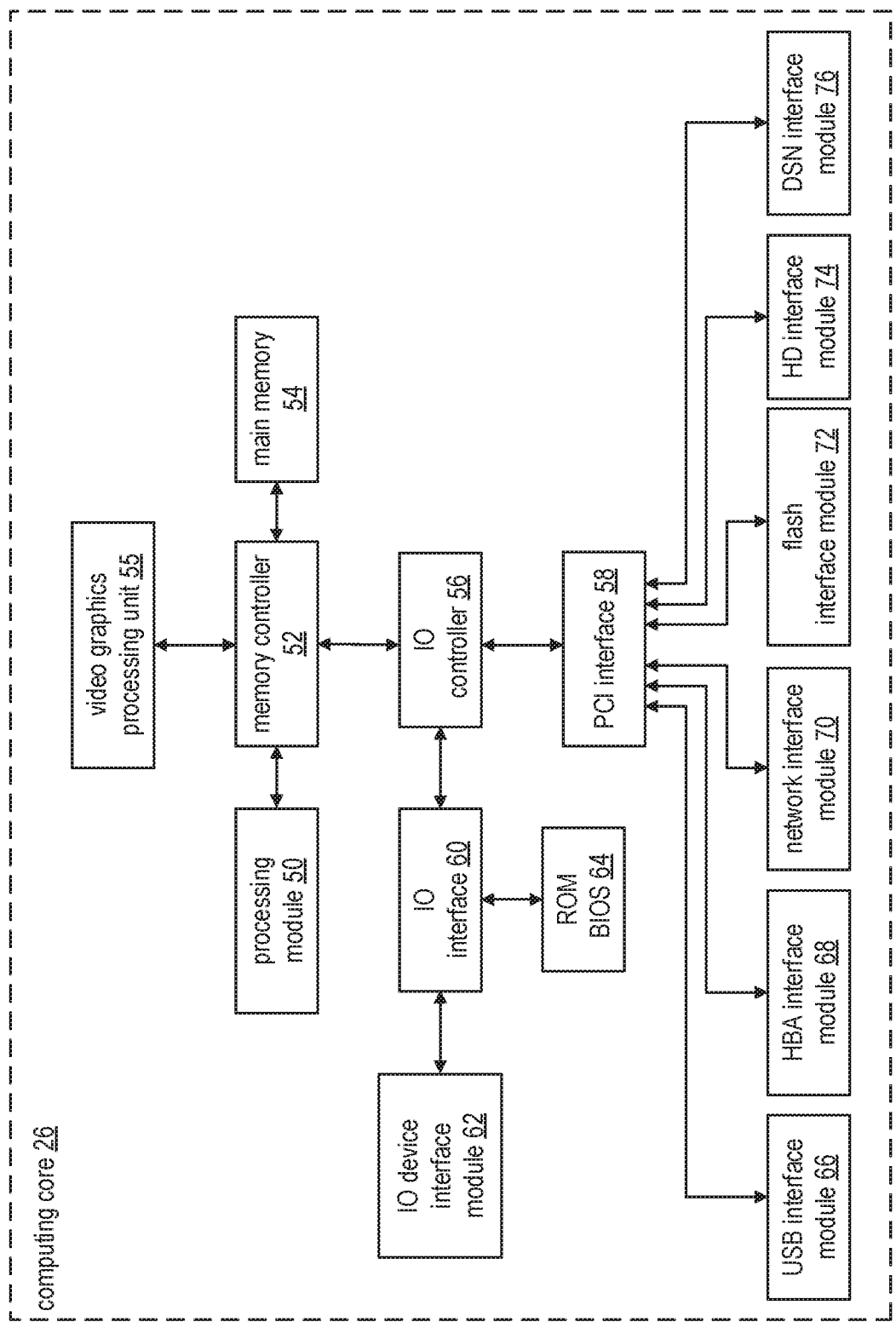
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices and key slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall addressing namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
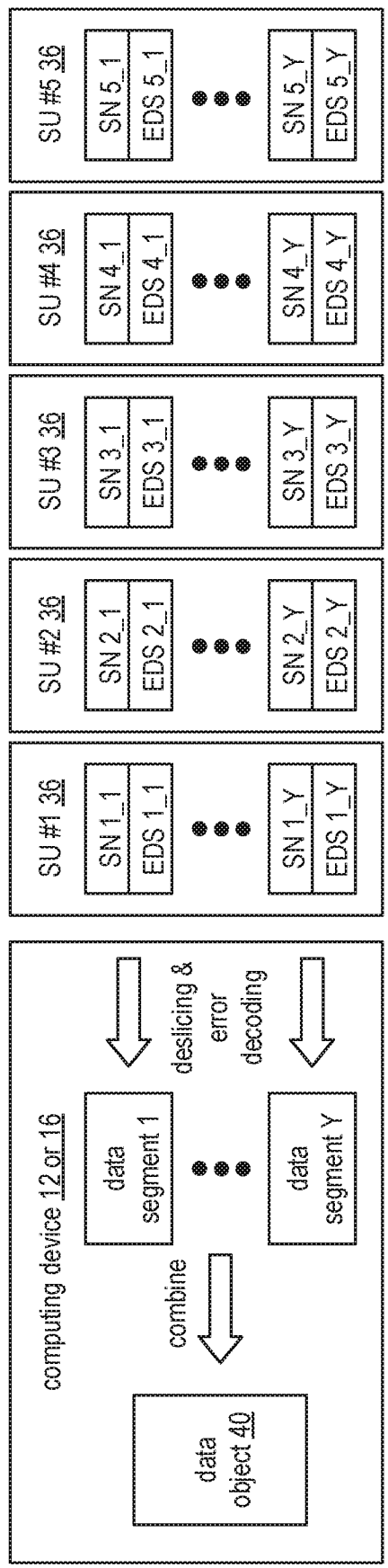
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
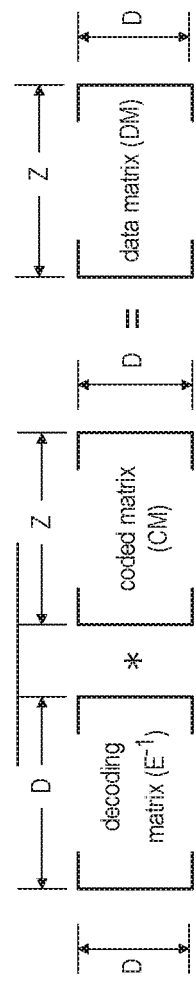
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

As noted above, the managing unit 18 may coordinate creation of a vault (e.g., a virtual memory block associated with a portion of an overall addressing namespace of the DSN). A vault region may also be established as a dedicated section of a vault's namespace which denotes (or signals to storage units) that a certain class of data will be stored within that namespace range for that region. The region may be marked by a field within a slice name, and can be used by a storage unit to select the manner in which the slice will be stored. For example, one region may be used to signal immutable slices, another region may be used for frequently updated slices, and a further region for temporary data that has relatively low significance if lost.

As used herein, the term "key region" refers to a vault region designated for storage of encoded slices relating to cryptographic keys. Cryptographic keys have a number of unique properties that distinguish them from other types of data that may be stored in a DSN. For example, while cryptographic keys are typically relatively small, it is important that they not be lost or exposed in an unauthorized manner. In addition, unlike certain other types of data, cryptographic keys do not change and are generally stored and accessed at a relatively low rate as compared to other data.

In view of these considerations, a storage unit according to the present disclosure may impose novel restrictions on data stored in a key region. For example, for an encoded data slice (e.g., a key slice) stored in a key region, a storage unit may (1) store the slice in a memory device in an encrypted form using a local key known only to the storage unit, (2) prevent the slice from being overwritten or deleted, (3) store the slice in a memory type which permits secure erasure in the event the slice is deleted, and (4) not permit certain types of rebuild requests, and instead only allow zero information gain (ZIG) rebuilding functions. With respect to (3), secure erasure of a key slice (e.g., in response to a delete request, expiration of a key, following migration of key data, etc.) may comprise overwriting the relevant portion of the key region with zeros or ones, a fixed pattern of bits, a randomized pattern of bits, or combinations thereof in a multi-pass approach. Secure erasure procedures may likewise be employed when deleting the local keys described below.

Such safeguards permit a vault to be used as a secure key storage system such as described in greater detail below in conjunction with the examples of FIGS. 9 and 10. Moreover, if stored keys are used to encrypt data slices stored in other regions (e.g., non-key regions) of a vault, then regular rebuilding operations can occur on these data slices without exposing them, while relatively slower ZIG rebuilding functions can be reserved for key slices stored in the key region. In addition, different (e.g., more secure/expensive) codecs or ciphers may be utilized for data stored in a key region as compared to other vault regions.

Figure 9:
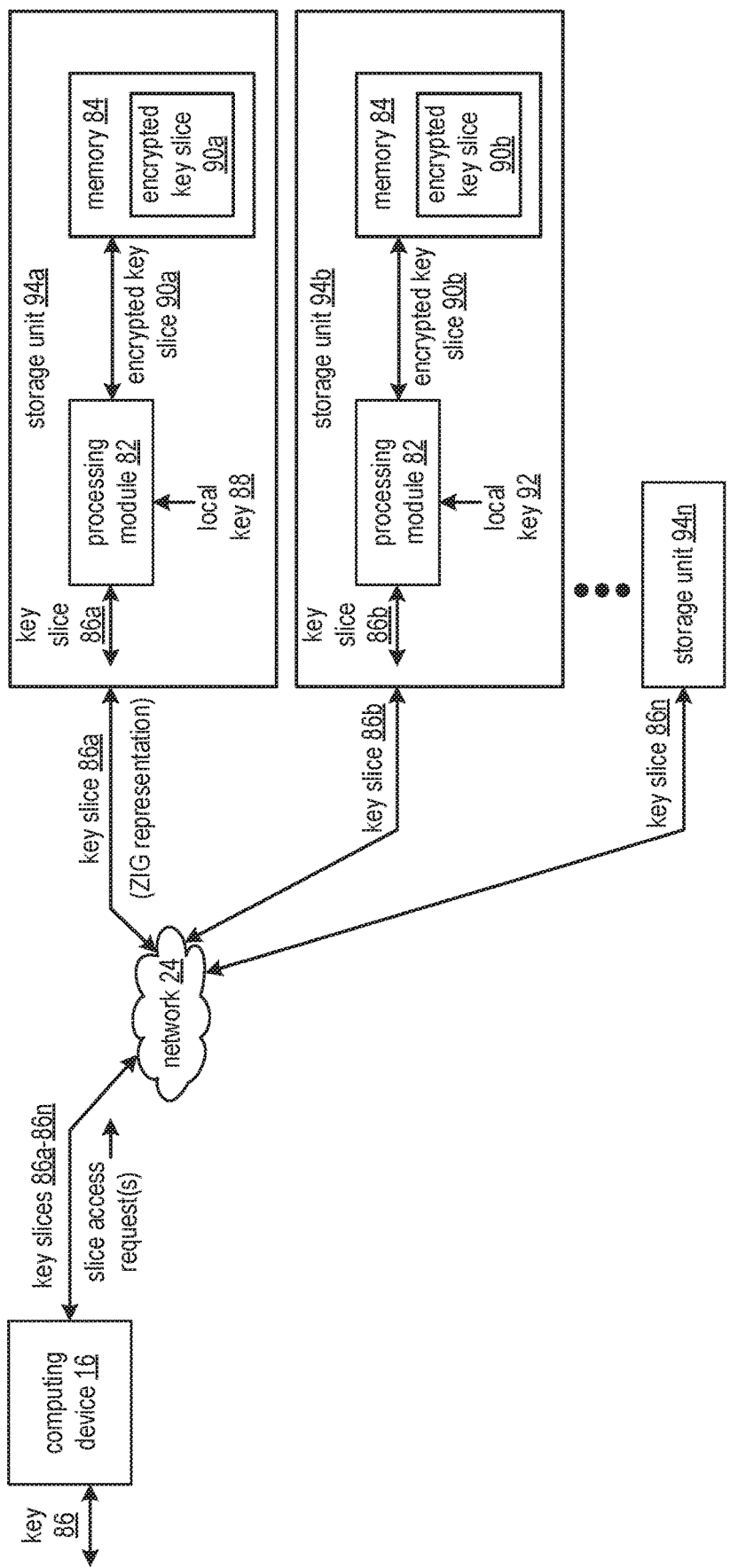
FIG. 9 is a schematic block diagram of another embodiment of a DSN performing secure storage of a cryptographic key in accordance with the present disclosure.

Referring now to FIG. 9, a schematic block diagram of another embodiment of a dispersed storage network (DSN) performing secure storage of a cryptographic key in accordance with the present disclosure is shown. The illustrated DSN includes the computing device 16 of FIG. 1, the network 24 of FIG. 1, and a set of storage units 94a-94n. Each storage unit 94a-94n may be implemented utilizing the storage unit 36 of FIG. 1, and each of the storage units includes a DS client module 34 (not separately illustrated), a processing module 82 and memory 84. The storage units of a storage set may be located at a same physical location (site) or located at multiple physical locations without departing from the technology as described herein. The DSN functions to securely store an encryption key 86.

In general, DSN memory stores a plurality of dispersed storage (DS) error encoded data slices. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

In an example of operation of the secure storage of the encryption key, a storage unit identifies a type of the received slice access request. Types of slice access requests may include a write slice access request, a write key slice access request, a read slice access request, a read key slice access request, and a read key slice access request for rebuilding, where a key slice is one of a set of related key slices 86a-86n, where the computing device 16 dispersed storage error encodes an encryption key to produce the set of (encoded) key slices 86a-86n. For example, the processing module 82 of the storage unit 94a receives a write slice request from the computing device 16, where the write slice request includes a key slice 86a. Identifying the type of a received slice access request may include one or more of matching a slice name to a slice name range of a set of slice name ranges and associated types, extracting an indicator from the slice access request, and inferring the type of request based on the identity of the requesting entity (e.g., identifying a rebuilding type when the request is received from a requesting entity associated with an identifier of a rebuilding module within the DSN).

When the identified type of slice access request involves accessing/storing a key slice, the storage unit utilizes a local key (e.g., an encryption key that is locally-stored in memory of the storage unit) to provide improved security of storage of the key slice. For example, when storing the key slice 86a, the processing module 82 of the storage unit 94a encrypts the received key slice 86a with a local key 88 to produce an encrypted key slice 90a for storage in the memory 84. As another example, when the slice access request includes a request to recover/retrieve a key slice stored in the storage unit (e.g., a read key slice request), the processing module 82 decrypts a recovered encrypted key slice 90a using the local key 88 to reproduce the key slice 86a for provision to a requesting entity. Local key 88 and local key 92 may be part of a set of related but distinct local keys.

Alternatively, when the identified type of slice access request indicates a rebuilding request, the storage unit returns a representation of the key slice to a requesting entity. For example, the processing module 82 decrypts a recovered encryption key slice utilizing the local key to reproduce the key slice, processes the decrypted key slice to produce a zero information gain (ZIG) representation of the decrypted key slice, and sends, via the network 24, the ZIG representation of the decrypted key slice to the computing device 16 or other requesting entity.

In an example, processing of the decrypted key slice to produce a zero information gain representation (such as may be used to reproduce a different key slice of a set of key slices for recovery) includes obtaining an encoding matrix utilized to generate the (encoded) key slice for recovery, reducing the encoding matrix to produce a square matrix that exclusively includes rows associated with a selected decode threshold number of key slices, inverting the square matrix to produce an inverted (or decoding) matrix, and matrix multiplying the inverted matrix by the decrypted key slice to produce a vector, and matrix multiplying the vector by a row of the encoding matrix corresponding to the desired key slice to produce the ZIG representation of the decrypted key slice. A rebuilding entity receives and decodes the representation of the decrypted key slice utilizing a ZIG dispersed storage error coding function to reproduce a key slice. For example, the rebuilding entity decodes a threshold number of representations of decrypted key slices, including exclusive ORing the selected decode threshold number of representations of decrypted key slices to reproduce a key slice.

Figure 10:
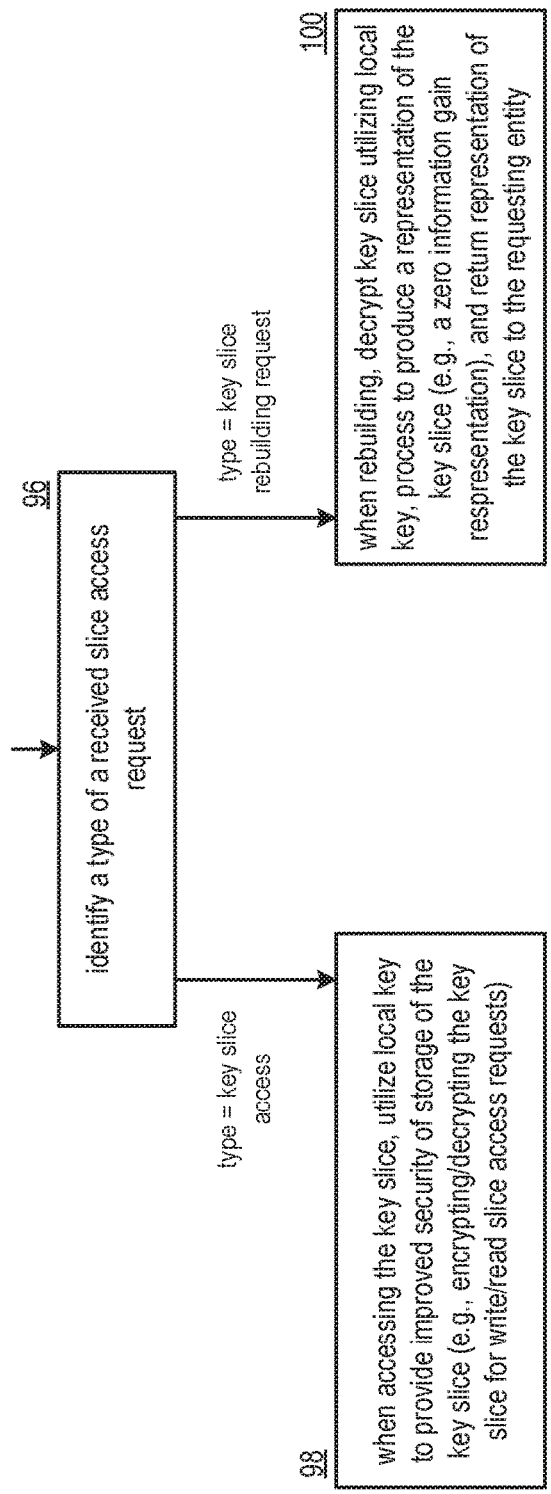
FIG. 10 is a logic diagram illustrating an example of accessing and rebuilding key slice data in accordance with the present disclosure.

FIG. 10 is a logic diagram illustrating an example of accessing and rebuilding key slice data in accordance with the present disclosure. The method includes step 96 where a processing module (e.g., of a storage unit) identifies a type of the received slice access request. Identifying the type of a received slice access request may include at least one of matching a slice name to a slice name range of a set of slice name ranges and associated types, extracting an indicator from the slice access request, and inferring the type of request based on the identity of the requesting entity.

When the identified type of slice access request includes accessing a key slice, the method continues at step 98 where the processing module utilizes a local key to provide improved security of storage of the key slice. For example, when storage of a key slice is requested, the processing module encrypts a key slice (e.g., received in conjunction with the slice access request) with the local key to produce an encrypted key slice for storage in a memory of a recipient storage unit. As another example, when recovering a key slice in response to a read key slice request, the processing module decrypts a recovered encrypted key slice utilizing the local key to reproduce the (encoded) key slice, and sends the key slice to the requesting entity.

When the type of slice access request is a key slice rebuilding request (i.e., relates to a rebuilding task), the method continues at step 100 where the processing module retrieves a representation of the key slice. For example, the processing module decrypts a recovered encrypted key slice utilizing a locally-stored key to reproduce the key slice, and processes the reproduced key slice to produce a zero information gain (ZIG) representation of the reproduced key slice, and sends the ZIG representation of the reproduced key slice to the requesting entity.

The methods described above in conjunction with the computing device 16 and storage units 1-n can alternatively be performed by other modules (e.g., DS client modules 34) of a dispersed storage network or by other devices (e.g., integrity processing unit 20). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of a storage unit of a dispersed storage network (DSN), the storage unit including a local key, the method comprises:
receiving a slice access request from a requesting entity;
identifying the type of the slice access request as a key slice access request, wherein the key slice access request includes at least one of a request to store a key slice or a request to recover a key slice for rebuilding;
in response to determining that the key slice access request includes a request to store a key slice received in conjunction with the key slice access request:
encrypting the key slice using the local key of the storage unit to produce an encrypted key slice; and
storing the encrypted key slice in a memory of the storage unit; and
in response to determining that the key slice access request includes a request to recover a key slice for rebuilding, wherein the key slice is stored as an encrypted key slice in a memory of the storage unit:
recovering the encrypted key slice from the memory of the storage unit;
decrypting the encrypted key slice using the local key of the storage unit to produce a decrypted key slice; and
encoding the decrypted key slice in accordance with a zero information gain (ZIG) format to generate a ZIG representation of the decrypted key slice for provision to the requesting entity.

2. The method of claim 1, wherein the key slice access request includes at least one of a request to store a key slice, a request to recover a key slice, or a request to recover a key slice for rebuilding, the method further comprises:
in response to determining that the key slice access request includes a request to recover a key slice, wherein the key slice is stored as an encrypted key slice in a memory of the storage unit:
recovering the encrypted key slice from the memory of the storage unit; and
decrypting the encrypted key slice using the local key of the storage unit to produce a decrypted key slice.

3. The method of claim 1, wherein encoding the decrypted key slice in accordance with a zero information gain (ZIG) format to generate a ZIG representation of the decrypted key slice comprises:
obtaining an encoding matrix utilized to generate a related key slice to be recovered;
generating a decoding matrix based on the encoding matrix;
matrix multiplying the decoding matrix by the decrypted key slice to produce a vector; and
matrix multiplying the vector by a row of the encoding matrix corresponding to the related key slice to be recovered to produce the ZIG representation of the decrypted key slice.

4. The method of claim 3, wherein the generating the decoding matrix comprises:
reducing the encoding matrix to produce a square matrix that exclusively includes rows associated with a selected decode threshold number of related key slices; and
inverting the square matrix to produce the decoding matrix.

5. The method of claim 1, wherein identifying the type of the slice access request as a key slice access request includes at least one of:
matching a slice name to a slice name range of a set of slice name ranges and associated types;
extracting an indicator from the slice access request; or
inferring the type of the slice access request based on the identity of the requesting entity.

6. The method of claim 1, wherein the key slice is one of a set of key slices 1-n generated by encoding a key using a dispersed storage error encoding function, and wherein the key can be recreated from a decode threshold number of key slices of the set of key slices 1-n.

7. The method of claim 1, wherein the key slice is stored in a portion of the memory of the storage unit that is configured as part of a key region of a vault having a designated addressing namespace within the DSN.

8. The method of claim 1, wherein the local key of the storage unit is a key of a set of related keys stored in respective storage units of a set of storage units of the DSN.

9. A method for execution by one or more processing modules of a storage unit of a dispersed storage network (DSN), the storage unit including a local key, the method comprises:
receiving a slice access request;
determining that the type of the slice access request includes a request to store a key slice;
receiving the key slice for storage, wherein the key slice is one of a set of key slices 1-n generated by encoding a key using a dispersed storage error encoding function, and wherein the key can be recreated from a decode threshold number of key slices of the set of key slices 1-n;
encrypting the key slice using the local key of the storage unit to produce an encrypted key slice;
storing the encrypted key slice in a memory of the storage unit;
receiving a second slice access request;
in response to the second slice access request, recovering the encrypted key slice from the memory of the storage unit;
decrypting the encrypted key slice using the local key of the storage unit to produce a decrypted key slice; and
encoding the decrypted key slice with a zero information gain (ZIG) format to generate a ZIG representation of the decrypted key slice.

10. The method of claim 9, wherein determining that the type of the slice access request includes a request to store a key slice includes at least one of:
matching a slice name to a slice name range of a set of slice name ranges and associated types;
extracting an indicator from the slice access request; or
inferring the type of the slice access request based on an identity of a requesting entity.

11. The method of claim 9, wherein the key slice is included in the slice access request.

12. The method of claim 9, wherein storing the encrypted key slice in a memory of the storage unit includes storing the encrypted key slice in a portion of the memory that is configured as part of a key region of a vault having a designated addressing namespace with the DSN.

13. The method of claim 9, wherein the local key of the storage unit is a key of a set of related keys stored in respective storage units of a set of storage units of the DSN.

14. The method of claim 9 further comprises:
determining that the type of the second slice access request includes a request to recover a key slice for rebuilding.

15. A storage unit of a dispersed storage network (DSN), the storage unit comprises:

a network interface;
a local memory, the local memory including a local key;
a memory device; and
a processing module operably coupled to the network interface, the local memory, and the memory device, wherein the processing module is configured to:
receive, via the network interface, a slice access request from a requesting entity;
identify the type of the slice access request as a key slice access request, wherein the key slice access request includes at least one of a request to store a key slice or a request to recover a key slice for rebuilding;
in response to determining that the key slice access request includes a request to store a key slice received in conjunction with the key slice access request:
encrypt the key slice using the local key to produce an encrypted key slice; and
store the encrypted key slice in the memory device; and
in response to determining that the key slice access request includes a request to recover a key slice for rebuilding, the key slice stored as an encrypted key slice in the memory device:
recover the encrypted key slice from the memory device;
decrypt the encrypted key slice using the local key to produce a decrypted key slice; and
encode the decrypted key slice in accordance with a zero information gain (ZIG) format to generate a ZIG representation of the decrypted key slice for provision to the requesting entity.

16. The storage unit of claim 15, wherein the key slice access request includes at least one of a request to store a key slice, a request to recover a key slice, or a request to recover a key slice for rebuilding, and wherein the processing module is further configured to:
in response to determining that the key slice access request includes a request to recover a key slice, wherein the key slice is stored as an encrypted key slice in the memory device:
recover the encrypted key slice from the memory device; and
decrypt the encrypted key slice using the local key to produce a decrypted key slice.

17. The storage unit of claim 15, wherein identifying the type of the slice access request as a key slice access request includes at least one of:
matching a slice name to a slice name range of a set of slice name ranges and associated types;
extracting an indicator from the slice access request; or
inferring the type of the slice access request based on the identity of the requesting entity.

18. The storage unit of claim 15, wherein the key slice is one of a set of key slices 1-n generated by encoding a key using a dispersed storage error encoding function, and wherein the key can be recreated from a decode threshold number of key slices of the set of key slices 1-n.

19. The storage unit of claim 15, wherein the key slice is stored in a portion of the memory device that is configured as part of a key region of a vault having a designated addressing namespace within the DSN.

20. The storage unit of claim 15, wherein the local key is a key of a set of related keys stored in respective storage units of a set of storage units of the DSN.

* * * * *